United States Patent
Starkey et al.

(10) Patent No.: US 7,980,973 B1
(45) Date of Patent: Jul. 19, 2011

(54) COAXIAL ELECTRICAL ACTUATOR FOR CONTINUOUSLY VARIABLE TRANSMISSIONS

(75) Inventors: John M. Starkey, West Lafayette, IN (US); Enrico N. Manes, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 11/952,987

(22) Filed: Dec. 7, 2007

Related U.S. Application Data (63) Continuation-in-part of application No. 11/415,391, filed on May 1, 2006.

(60) Provisional application No. 60/869,008, filed on Dec. 7, 2006.

(51) Int. Cl.
*F16H 59/00* (2006.01)

(52) U.S. Cl. .......................................................... 474/18

(58) Field of Classification Search ................... 474/18, 474/43, 8, 20, 25, 26, 39; 310/12.14, 75 R, 310/80, 83, 112, 115, 118
See application file for complete search history.

(56) References Cited

U.S. PATENT DOCUMENTS

| | | |
|---|---|---|
| 197,472 A | 11/1877 | Hunt |
| 2,184,395 A | 12/1939 | Morse |
| 2,400,294 A | 5/1946 | Firth et al. |
| 2,532,124 A | 11/1950 | Shaw |
| 2,611,277 A | 9/1952 | Mitchell |
| 2,754,691 A | 7/1956 | May |
| 2,884,810 A | 5/1959 | Chapman |
| 3,105,397 A | 10/1963 | Hayden |
| 3,214,991 A | 11/1965 | Perrin |
| 3,491,609 A | 1/1970 | Henriksen |
| 3,571,884 A | 3/1971 | Chung |
| 3,776,053 A | 12/1973 | Segerstad |
| 3,861,221 A | 1/1975 | Stanley |
| 3,965,761 A | 6/1976 | Stanley |
| 4,258,584 A | 3/1981 | Haegele et al. |
| 4,366,723 A | 1/1983 | Wilke et al. |
| 4,541,821 A | 9/1985 | Sakakibara |
| 4,573,566 A | 3/1986 | Roman |

(Continued)

FOREIGN PATENT DOCUMENTS

DE        3629281 A1      3/1988

(Continued)

OTHER PUBLICATIONS

J. Singh et al., "General Motors "VTi" Electronic Continuously Variable Transaxle," *Transmission & Driveline Systems Symposium 2003, SAE International*, © 2003, pp. 99-106.

(Continued)

*Primary Examiner* — Robert Siconolfi
*Assistant Examiner* — Stephen Bowes
(74) *Attorney, Agent, or Firm* — William F. Bahret (57) ABSTRACT

An electrically actuated continuously variable transmission (CVT) with an electric motor coaxially mounted on one of the pulleys of the CVT and having its rotor and stator both rotating with the pulley. One of two portions of the pulley is fixed-mounted on an engine shaft or other power source shaft, and the second is relatively axially movable with respect to the first. The rotor is rotatably fixed to the second pulley portion in certain embodiments, and is rotatably connected to it in other embodiments.

19 Claims, 6 Drawing Sheets

U.S. PATENT DOCUMENTS

| | | | |
|---|---|---|---|
| 4,601,680 | A | 7/1986 | Tokoro |
| 4,614,128 | A | 9/1986 | Fickler |
| 4,703,666 | A | 11/1987 | Fickler |
| 4,715,241 | A | 12/1987 | Lipinski et al. |
| 4,811,225 | A | 3/1989 | Petzold et al. |
| 4,838,834 | A | 6/1989 | Miyata |
| 4,926,709 | A | 5/1990 | Gardner |
| 4,964,841 | A | 10/1990 | Takayama et al. |
| 5,045,741 | A | 9/1991 | Dvorsky |
| 5,069,081 | A | 12/1991 | Morita |
| 5,094,118 | A | 3/1992 | Morita |
| 5,488,880 | A | 2/1996 | Sartorio |
| 5,527,225 | A | 6/1996 | Dick |
| 5,662,538 | A | 9/1997 | Wang |
| 5,860,888 | A | 1/1999 | Lee |
| 5,899,114 | A | 5/1999 | Dolata et al. |
| 5,984,829 | A | 11/1999 | Minagawa et al. |
| 6,026,696 | A | 2/2000 | Hehl |
| 6,077,187 | A | 6/2000 | Suzuki et al. |
| 6,186,020 | B1 | 2/2001 | Butsch |
| 6,186,915 | B1 | 2/2001 | Dietl |
| 6,219,608 | B1 | 4/2001 | Abo et al. |
| 6,243,638 | B1 | 6/2001 | Abo et al. |
| 6,468,170 | B1 * | 10/2002 | Ito ................................ 474/18 |
| 6,492,753 | B2 | 12/2002 | Zepp et al. |
| 6,626,778 | B1 | 9/2003 | Kapaan et al. |
| 6,689,000 | B1 | 2/2004 | Kapaan et al. |
| 6,743,129 | B1 | 6/2004 | Younggren et al. |
| 6,811,505 | B2 | 11/2004 | Hashimoto et al. |
| 6,853,109 | B2 | 2/2005 | Koyanagi et al. |
| 6,898,994 | B2 | 5/2005 | Walton |
| 6,908,405 | B2 | 6/2005 | Otaki et al. |
| 7,038,667 | B1 | 5/2006 | Vassallo et al. |
| 7,051,610 | B2 | 5/2006 | Stoianovici et al. |
| 2001/0049312 | A1 | 12/2001 | Warner et al. |
| 2002/0123400 | A1 | 9/2002 | Younggren et al. |
| 2004/0116218 | A1 * | 6/2004 | Butsch et al. ................. 474/8 |
| 2005/0037876 | A1 | 2/2005 | Unno et al. |
| 2005/0090367 | A1 | 4/2005 | Jonsson et al. |
| 2005/0096822 | A1 | 5/2005 | Aoki |
| 2005/0255957 | A1 | 11/2005 | Miller et al. |
| 2005/0272540 | A1 | 12/2005 | Starkey |
| 2006/0264279 | A1 | 11/2006 | Starkey et al. |

FOREIGN PATENT DOCUMENTS

| | | |
|---|---|---|
| DE | 197 01 859 A1 | 10/1998 |
| DE | 198 51 738 A1 | 5/2000 |
| DE | 19851738 A1 | 5/2000 |
| EP | 0 319 035 A1 | 6/1989 |
| EP | 0 701 073 A3 | 10/2000 |
| EP | 1 099 885 A2 | 5/2001 |
| EP | 0 931 228 B1 | 10/2002 |
| JP | S60-164054 | 2/1987 |
| JP | 621589847 A | 7/1987 |
| WO | WO00/49313 | 8/2000 |
| WO | WO00/60256 | 10/2000 |
| WO | WO 0060256 A1 | 10/2000 |
| WO | WO 03048612 A2 | 6/2003 |
| WO | WO 03/077403 A1 | 9/2003 |

OTHER PUBLICATIONS

F. W. Heilich et al., "Traction Drives: Selection and Application," Marcel Dekker, Inc., © 1983, pp. 6-7, 12-13, 16-17, 20-27, 30-49, 52-53, 56-61, 66-69, 74-75, 108-109.

M. Asumi et al., "Development of Electronically Controlled Belt-type CVT for Motorcycles," *Small Engine Technology Conference*, Tokoyo, Japan, 2005, 7 pgs.

Supplementary European Search Report, dated Mar. 18, 2008, Application No. EP 05744392.

Supplementary European Search Report with European Search Opinion dated Aug. 31, 2010, in European Application No. 06758880.6.

* cited by examiner

COAXIAL ELECTRICAL ACTUATOR FOR CONTINUOUSLY VARIABLE TRANSMISSIONS

CROSS-REFERENCE TO RELATED APPLICATIONS

This application is a continuation-in-part of patent application Ser. No. 11/415,391, filed May 1, 2006, which application is hereby incorporated by reference. This application also claims the benefit of U.S. Provisional Patent Application Ser. No. 60/869,008, filed Dec. 7, 2006, which application is hereby incorporated by reference.

BACKGROUND OF THE INVENTION

This invention relates generally to transmissions, and more particularly to methods and apparatus for actuation of continuously variable transmissions.

Transmissions are devices that transform the speed and torque in vehicles using gears, belts, or other drive components. Most transmission designs use discrete speed ratios: low ratios for acceleration, hill climbing, and heavy hauling, and high ratios for higher-speed travel. They use multiple parallel gear sets between input and output shafts. By changing which gear set carries the loads between the shafts, the speed ratio between the input and output shafts is altered.

Transmissions have also been designed that are continuously variable (CVTs). These generally use friction to transfer load from an input shaft to an output shaft. By altering the radial position of friction rollers, belts, or other components, the speed ratio is changed.

Most current CVTs rely upon fixed-design mechanical or hydraulic actuation that cannot be easily changed to respond to differing demands, such as varying vehicle cargo loads and operator performance demands. Accordingly, there is need for CVT actuation systems that are more flexible and adaptable.

SUMMARY OF THE INVENTION

The present invention provides an electrically actuated continuously variable transmission (CVT) with an electrical actuator that is concentric or coaxial with—and rotates with—one of the pulleys of the CVT. The CVT includes first and second variable-diameter pulleys mechanically linked by a drive belt or other flexible drive member, each of the pulleys having first and second relatively axially movable pulley portions. The electrical actuator includes first and second relatively movable parts coaxially mounted to one of the pulleys, the first part rotatably fixed to the first portion of the first pulley and the second part connected to the second portion of the first pulley.

According to one aspect of the invention, the coaxial electrical actuator is an electric motor comprising a stator and rotor connected respectively to the first and second portions of the first pulley.

The objects and advantages of the present invention will be more apparent upon reading the following detailed description in conjunction with the accompanying drawings.

DETAILED DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 1A:
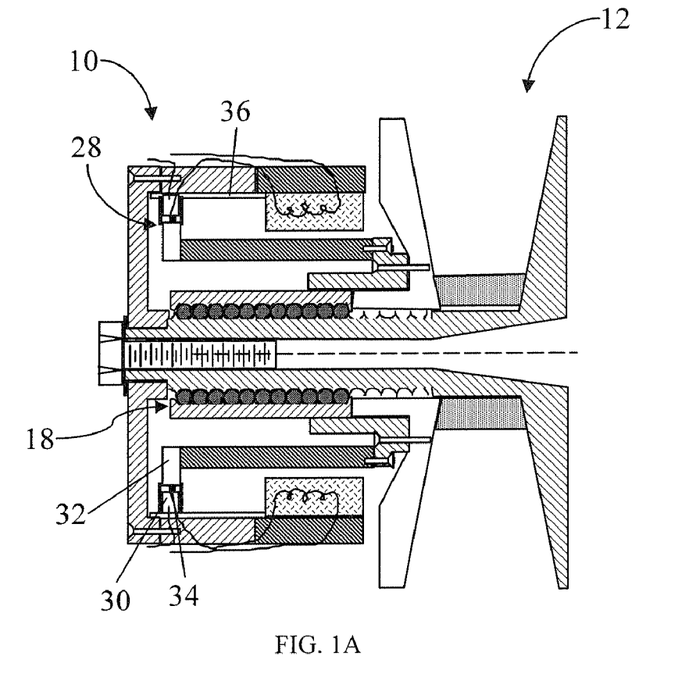
FIG. 1A is a cross-sectional view of an embodiment of a coaxially mounted electrical actuator in accordance with the present invention, in a lower speed ratio configuration.
Figure 1B:
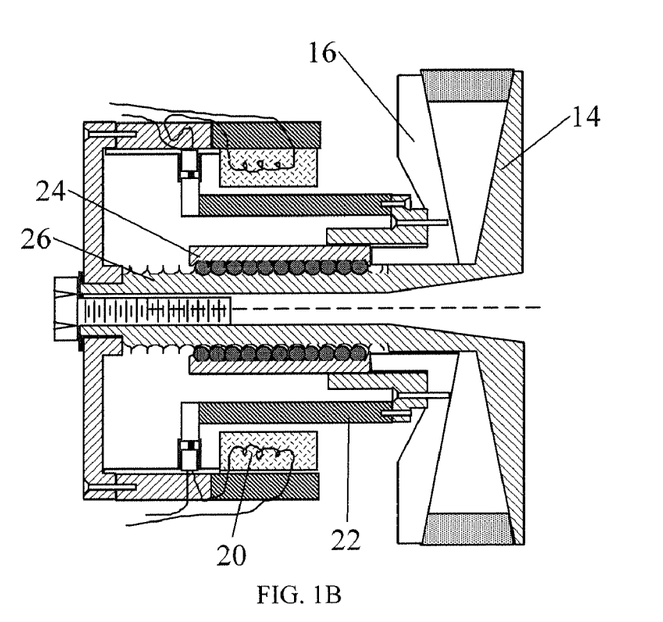
FIG. 1B is a cross-sectional view of the electrical actuator of FIG. 1A, shown in a higher speed ratio configuration.

FIGS. 1A and 1B show an embodiment of a coaxially mounted electrical actuator 10, according to the present invention, for a CVT pulley 12 having a first pulley half 14 for fixed connection to an engine's engine shaft (or other suitable power source, not shown), and a second movable pulley half 16 for connection to the engine shaft through a ball screw 18. The electrical actuator involves a frameless hollow motor that normally rotates with the engine shaft and pulley during operation of the engine. The motor's stator 20 (in this case the armature, e.g., electromagnetic coils, in the outer part of the motor) rotates with respect to the engine, but remains stationary with respect to the engine shaft because it is fixed to the fixed pulley half. The motor's rotor 22 (in this case the field magnets, e.g., permanent magnets, in the inner part of the motor) normally rotates at the same speed as the engine shaft and pulley when no axial spacing change between the pulley halves is required, but changes speed with respect to the engine shaft when the electrical actuator is used to change the axial spacing between the pulley halves and thus change the effective pulley diameter. In another configuration of this embodiment, the stator may comprise the field magnet and the rotor may comprise the armature.

In the embodiment as shown in FIGS. 1A and 1B, pulley half 14 is rotatably fixed or nonrotatable, i.e., not capable of rotating, with respect to the engine shaft, and it is also axially fixed. It will be understood, however, that this is but one example of a pulley with relatively axially movable pulley portions, and that both pulley halves may be axially movable or floating to some degree while still having their relative axial spacing controlled by an actuator in accordance with the present invention. It should also be understood that, in some applications, it may be suitable to have a coaxial electrical actuator according to the present invention alternatively mounted on the CVT's driven pulley, i.e., the pulley driven by pulley 12 via a drive belt or other flexible drive member.

When actuated, the motor imparts a torque between the outer rotating part (stator 20), which is connected to the engine shaft, and the inner rotating part (rotor 22), which is connected to the outer rotatable part 24 of the ball screw 18 (ball screw nut). The inner part 26 of the ball screw is connected to the engine shaft. The outer part of the ball screw is also fixed to the movable pulley half of the driver pulley of the CVT. The ball screw constrains the movable pulley half 16 to simultaneously rotate and translate with respect to the fixed pulley half 14, as prescribed by the helix angle of the ball screw. Relative motion is imparted between the inner and outer rotating parts of the motor when current is applied to the electromagnetic coils, thereby rotating the movable pulley half and the ball screw nut about the ball screw thread, which translates the movable pulley half toward the fixed pulley half. Likewise, when opposite rotational motion is imparted to the motor, the pulley halves are moved apart.

The motor can be of either the brushed type or brushless type. For the brushed type, a commutator 28 is needed that translates with the movable pulley half 16. The commutator has an outer part 30 that rotates with the outer part of the motor, and an inner part 32 that rotates with the inner part of the motor. Brushes 34 connect these two parts through contacts that switch current among the coils in the motor to maintain proper orientation of the magnetic fields. The translation of this commutator can be accommodated with a feature, such as a spline 36, which constrains rotational motion between the outer part of the commutator and the outer part of the motor, but allows axial relative motion between the two. Slip rings (not shown) would be used to power the spinning motor from a power source not rotating with the engine shaft.

Figure 2:
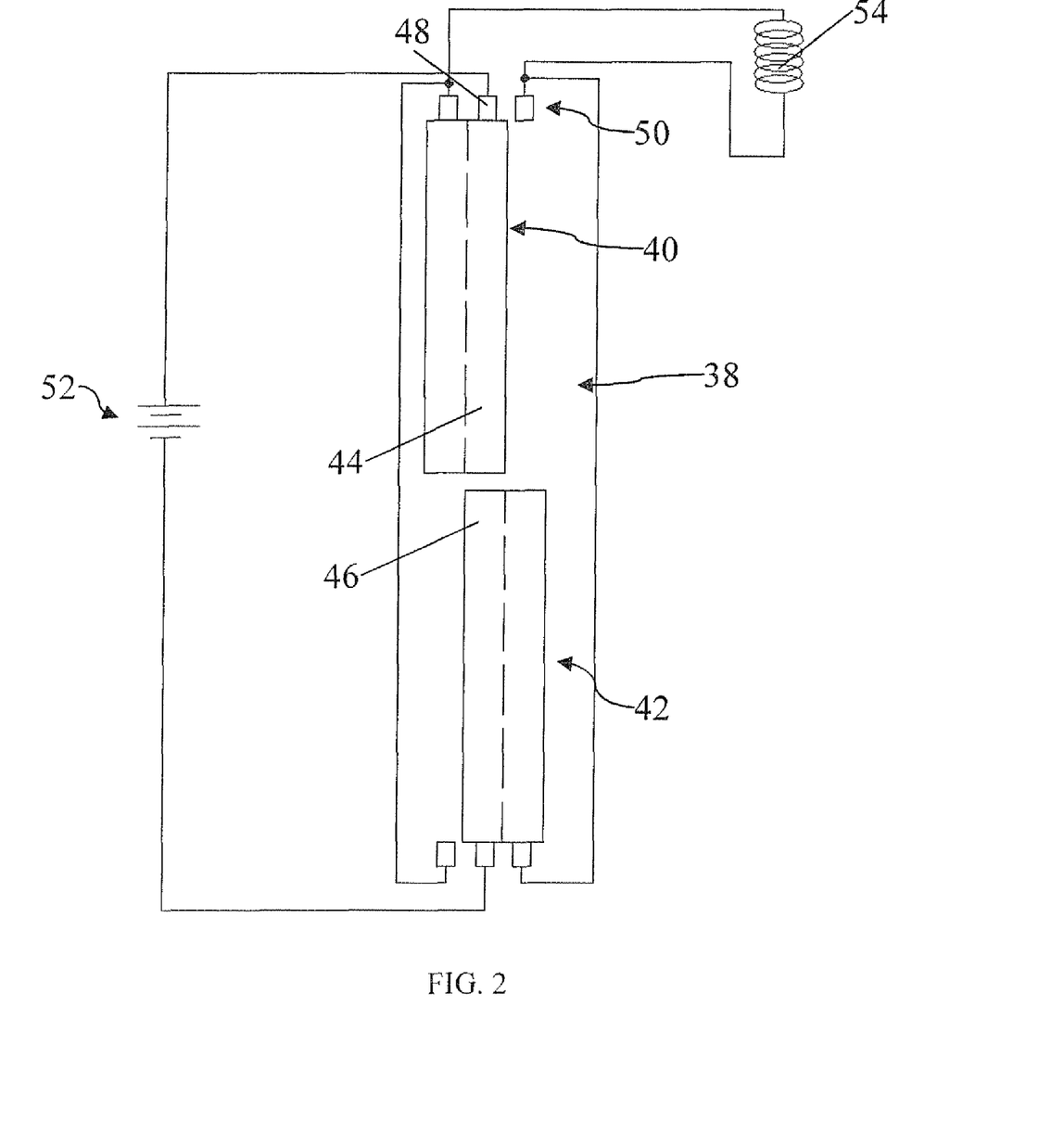
FIG. 2 shows a side view of an example of a translating commutator for use with the electrical actuator of FIG. 1.

FIG. 2 shows a side view of an example of a translating commutator for use in this embodiment. The inner part 32 of the commutator 28, in this example is a split ring 38, i.e., a set of spaced semicircular contacts 40 and 42, with the contacts partially radially aligned and partially axially offset as shown in the drawing. The aligned portions 44 and 46 are also radially aligned with the middle brush 48 in each set of three brushes 50 on the outer part of the commutator. The positive and negative terminals of an external power source 52 are connected to respective middle brushes (through the slip rings), and the other two brushes in each set are connected to the respective ends of a coil 54. The inner and outer parts of the commutator are constrained to move together axially, such that the brushes remain radially aligned with their respective portions of the commutator contacts as shown in the drawing. As the commutator rotates with respect to the brushes, the middle brush in each set is alternately connected to the brushes on either side of it, and the direction of current in the coil thereby reverses. Electrical connections between the brushes and the coils and slip rings are preferably made with elongated rigid contacts rather than moving wires.

An alternative embodiment is also contemplated which is the same as the embodiment of FIG. 1 except that the armature is the inner, axially movable part of the motor and the field magnets are the outer part. In this embodiment, the armature may include axially elongated commutator contacts to maintain electrical contact with brushes which may be supported, for example, by the end wall which supports the outer part of the motor.

For a brushless-frameless motor embodiment of the design shown in FIGS. 1A and 1B, sensors would be incorporated with the motor parts that produce signals indicative of the relative angular orientation of the inner and outer motor parts. These sensors would replace the commutator shown in FIGS. 1A and 1B, and its associated spline connection. Slip rings would be used to connect the sensors to a suitable electronic brushless motor controller not rotating with the engine shaft.

Advantages of a brushless-frameless motor design include:
(1) The ball screw 18 greatly reduces the friction in the actuator 10, which reduces the actuation power requirements;
(2) Both sides of the motor nominally rotate with the engine shaft which greatly reduces actuation power requirements because relative rotation between the two motor halves is very low; and
(3) Belt tension (resulting from engine drive torque) tends to actuate the pulley halves 14 and 16 because of the helical motion constraint of the ball screw. The lead of the screw (angle and hand) can be tuned to optimize this effect.

Figure 3A:
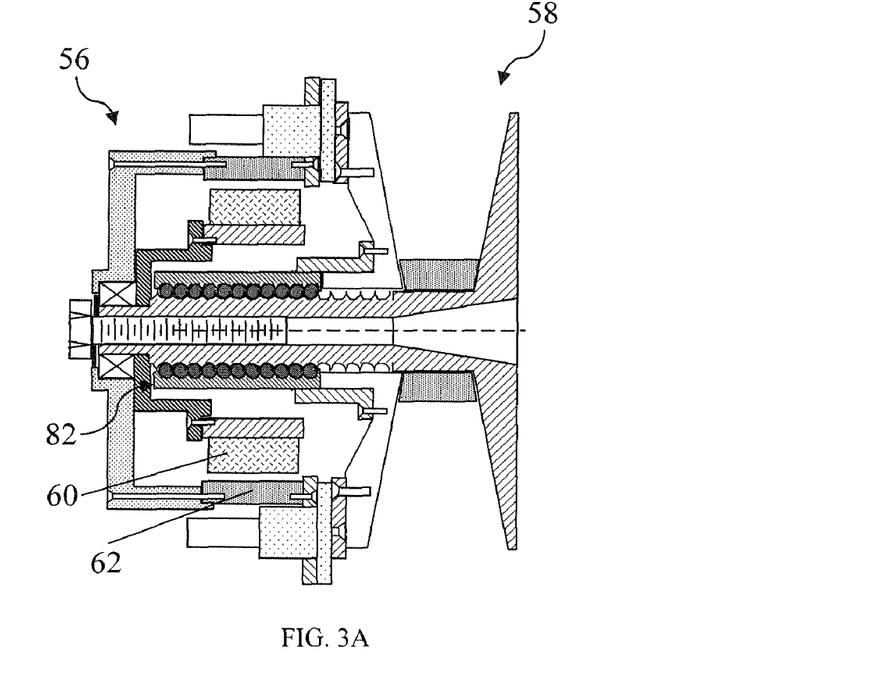
FIG. 3A is a cross-sectional view of another embodiment of a coaxially mounted electrical actuator in accordance with of the present invention.
Figure 3B:
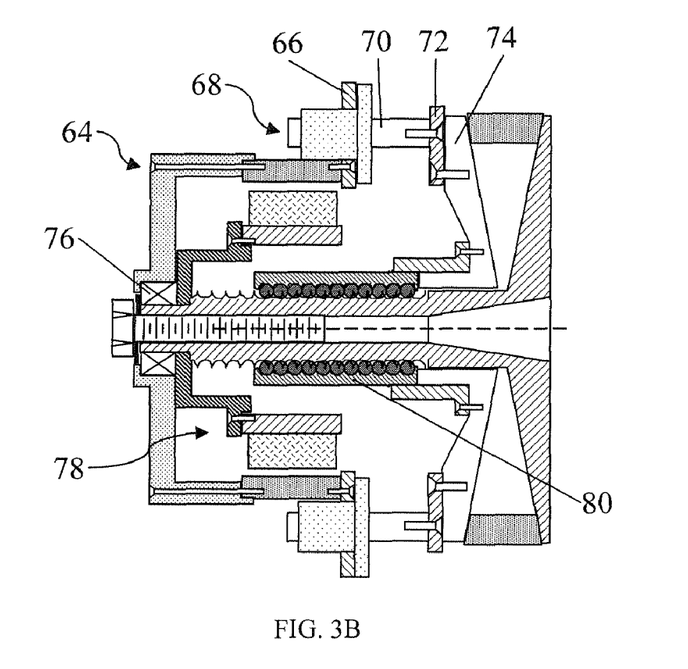
FIG. 3B is a cross-sectional view of the electrical actuator of FIG. 3A, shown in a higher speed ratio configuration.

FIGS. 3A and 3B show a second embodiment of a coaxially mounted electrical actuator 56 according to the present invention for a CVT pulley 58 as previously described. This embodiment also involves a frameless hollow motor that normally rotates with the engine shaft (not shown) and pulley during operation of the engine, but in this case the stator 60 is the motor's inner part (the armature), and the rotor 62 is the motor's outer part (the field magnet). Alternatively, in another configuration of this embodiment, the stator may comprise the field magnet, and the rotor may comprise the armature.

The outer rotating part 64 of the motor is connected to a linear bearing plate 66, to which are mounted at least two linear bearings 68. Through the center of each linear bearing is a shaft or pin 70, which is connected through a base plate 72 to the movable pulley half 74. The linear bearings constrain the relative motion between the outer rotating part of the motor and the movable pulley half to be purely axial. The outer rotating part of the motor is also connected to the engine shaft through a bearing 76, which constrains it to allow only relative rotation with respect to the engine shaft, about its axis.

When current is applied to the motor and relative motion is thereby imparted between its rotating parts, the motor imparts a torque between its inner rotating part 78, which is connected to the engine shaft, and its outer rotating part 64, which is connected through the linear bearings 68 and the movable pulley half 74 to the outer rotatable part 80 of a ball screw 82. This torque urges the outer part of the ball screw to rotate, thereby also translating the movable pulley half, according to the helical relative motion constraint that the ball screw imparts between the pulley halves. By changing the direction of the torque to the motor, the pulley halves can be made to move either apart or together.

The motor can be of either the brushed type or brushless type. For the brushed type, a commutator (not shown) is used. The commutator has an outer part that rotates with the outer part of the motor 64, and an inner part, that rotates with the inner part of the motor 78. Brushes connect these two parts through contacts that switch current among the coils in the motor to maintain proper orientation of the magnetic fields. Slip rings (not shown) are used to power the spinning motor from a power source not rotating with the engine shaft.

For a brushless-frameless motor embodiment of the design shown in FIGS. 3A and 3B, sensors are incorporated with the motor parts that produce signals indicative of the relative angular orientation of the inner and outer motor parts. These sensors would replace the commutator described above. Slip rings would be used to connect the sensors to a suitable electronic brushless motor controller not rotating with the engine shaft.

The embodiment shown in FIGS. 3A and 3B is different from the embodiment shown in FIGS. 1A and 1B in that the inner and outer motor parts 78 and 64, respectively, do not translate relative to each other axially, simplifying commutation and reducing the length of the motor. To achieve this motor simplification, mechanical components have been added, including the linear bearings 68 and the roller bearing 76.

Figure 4A:
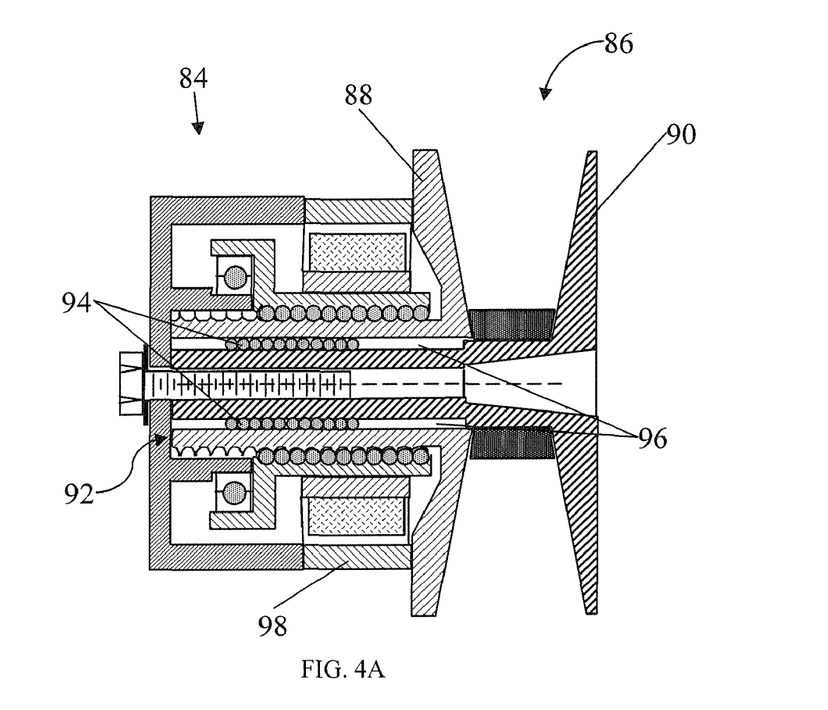
FIG. 4A is a cross-sectional view of yet another embodiment of a coaxially mounted electrical actuator in accordance with of the present invention.
Figure 4B:
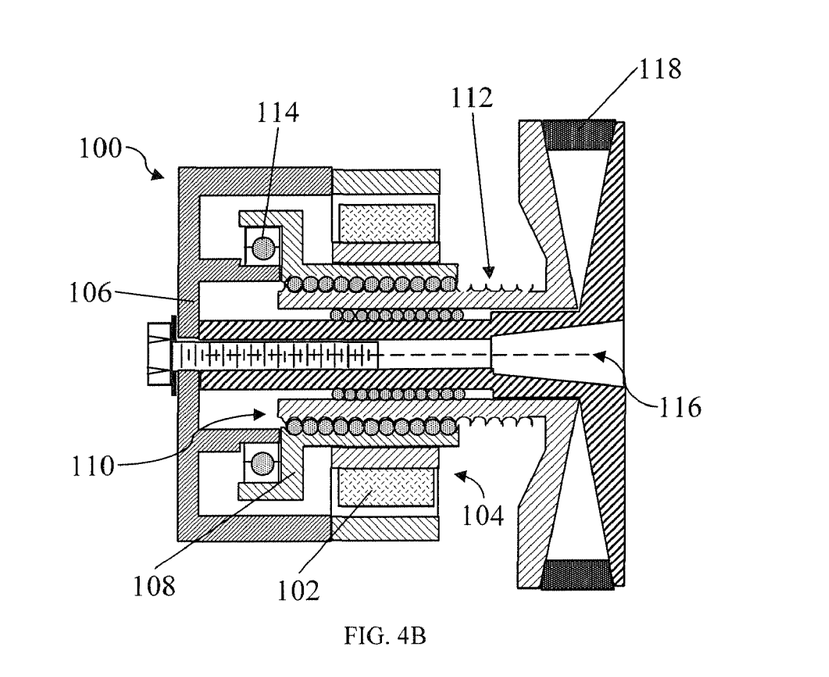
FIG. 4B is a cross-sectional view of the electrical actuator of FIG. 4A, shown in a higher speed ratio configuration.

FIGS. 4A and 4B show a third embodiment of a coaxially mounted electrical actuator 84, according to the present invention, for a CVT pulley 86 having a first pulley half 90 axially and rotatably fixed to the engine shaft (or other suitable power source, not shown), and a second movable pulley half 88 that is nonrotatably connected to the engine shaft such as through a spline, preferably a ball spline 92. The ball spline balls 94 roll in axial groves 96 in both the fixed and movable pulley halves, thereby allowing only axial relative motion between the two. The electrical actuator involves a frameless hollow motor that normally rotates with the engine shaft and pulley during operation of the engine. The motor's stator 98 (in this case the field magnets in the outer part of the motor 100) rotates with respect to the engine, but remains stationary with respect to the engine shaft because it is fixed to the fixed pulley half. The motor's rotor 102 (in this case the armature in the inner part of the motor 104) normally rotates at the same speed as the engine shaft and pulley when no axial spacing change between the pulley halves is required, but changes speed with respect to the engine shaft when the electrical actuator is used to change the axial spacing between the pulley halves. In another configuration of this embodiment, the stator may comprise the armature and the rotor may comprise the field magnets.

When actuated, the motor imparts a torque between the outer rotating part 100, which is connected to the engine shaft through a cup 106, and the inner rotating part 104, which is connected to the outer rotatable part 108 of the ball screw 110, called the ball screw nut. The inner part of the ball screw 112, called the ball screw thread, is formed as part of (or at least fixed to) the movable pulley half 88, concentric with the ball spline 92. The ball screw nut is also connected to the cup with a bearing 114 that constrains its motion relative to the fixed pulley half 90 to be only rotational about the pulley axes 116.

When current is applied to the motor and relative motion is thereby imparted between its rotating parts, the ball screw nut 108 is rotated relative to the cup 106, which is fixed to the fixed pulley half 90, which is rotatably fixed to the ball screw threads 112 by the ball spline 92. This causes the movable pulley half 88 to be moved axially relative to the fixed pulley half according to the constraints of the helix angle of the ball screw 110, such that the belt 118 is forced to contact the pulleys in different radial positions, changing the speed ratio of the CVT. When the opposite rotational motion is imparted to the motor, the pulley halves are moved in the opposite direction.

The motor can be of either the brushed type or brushless type. For the brushed type, a commutator is used (not shown). The commutator has an outer part that rotates with the outer part of the motor 100, and an inner part, that rotates with the inner part of the motor 104. Brushes connect these two parts through contacts that switch current among the coils in the motor to maintain proper orientation of the magnetic fields. Slip rings (not shown) would be used to power the spinning motor from a power source not rotating with the engine shaft.

For a brushless-frameless motor embodiment of the design shown in FIGS. 4A and 4B, sensors would be incorporated with the motor parts that produce signals indicative of the relative angular orientation of the inner and outer motor parts. These sensors would replace the commutator. Slip rings would be used to connect the sensors to a suitable electronic brushless motor controller not rotating with the engine shaft.

It should be understood by anyone of ordinary skill in the art that the ball screw 110 could be replaced with any other suitable type of threaded connection, the ball spline 92 could be replaced with any other suitable type of spline connection, including a key, and the bearing 114 could be replaced with any other suitable type of axial constraint, such as a bi-directional thrust bushing.

One advantage of the embodiment shown in FIGS. 4A and 4B over other concentric motor designs is that the belt tension (resulting from engine drive torque) has no influence on the actuation tendencies of the pulley halves 88 and 90, because the two pulley halves are splined together. This may be desirable for high engine power applications.

Figure 5A:
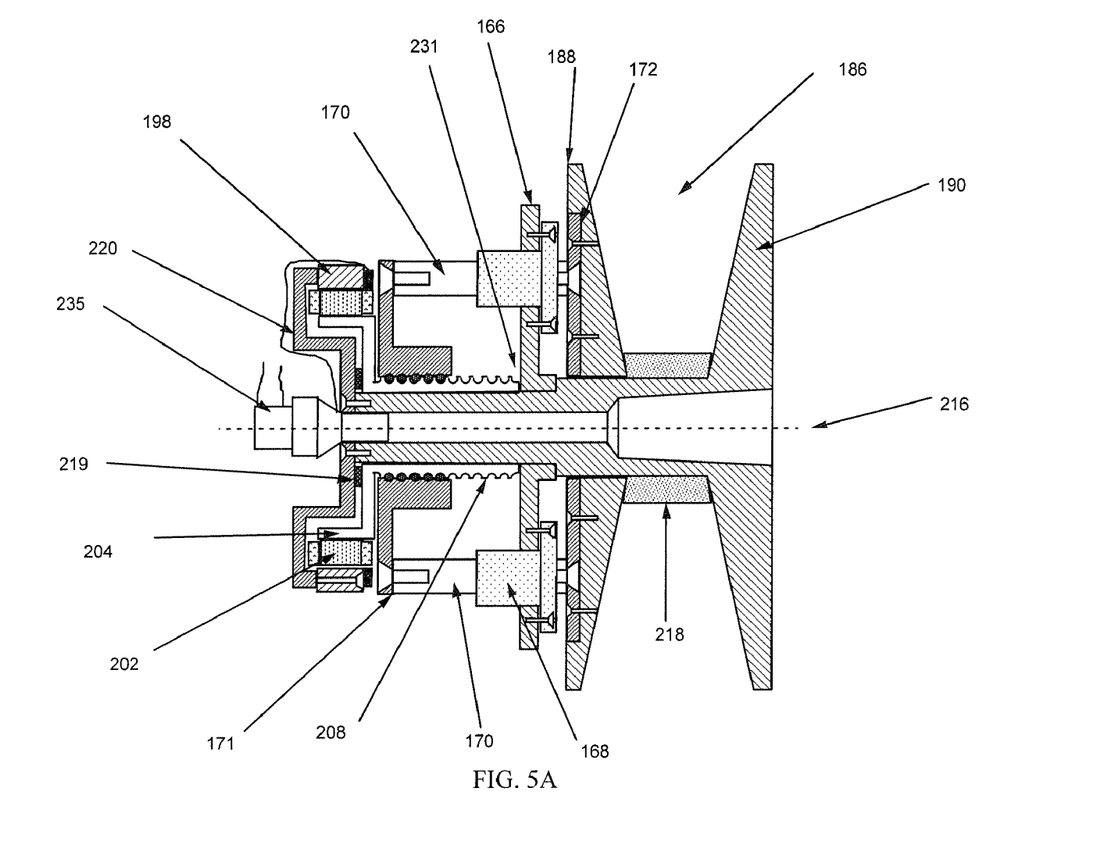
FIG. 5A is a cross-sectional view of yet another embodiment of a coaxially mounted electrical actuator in accordance with of the present invention.
Figure 5B:
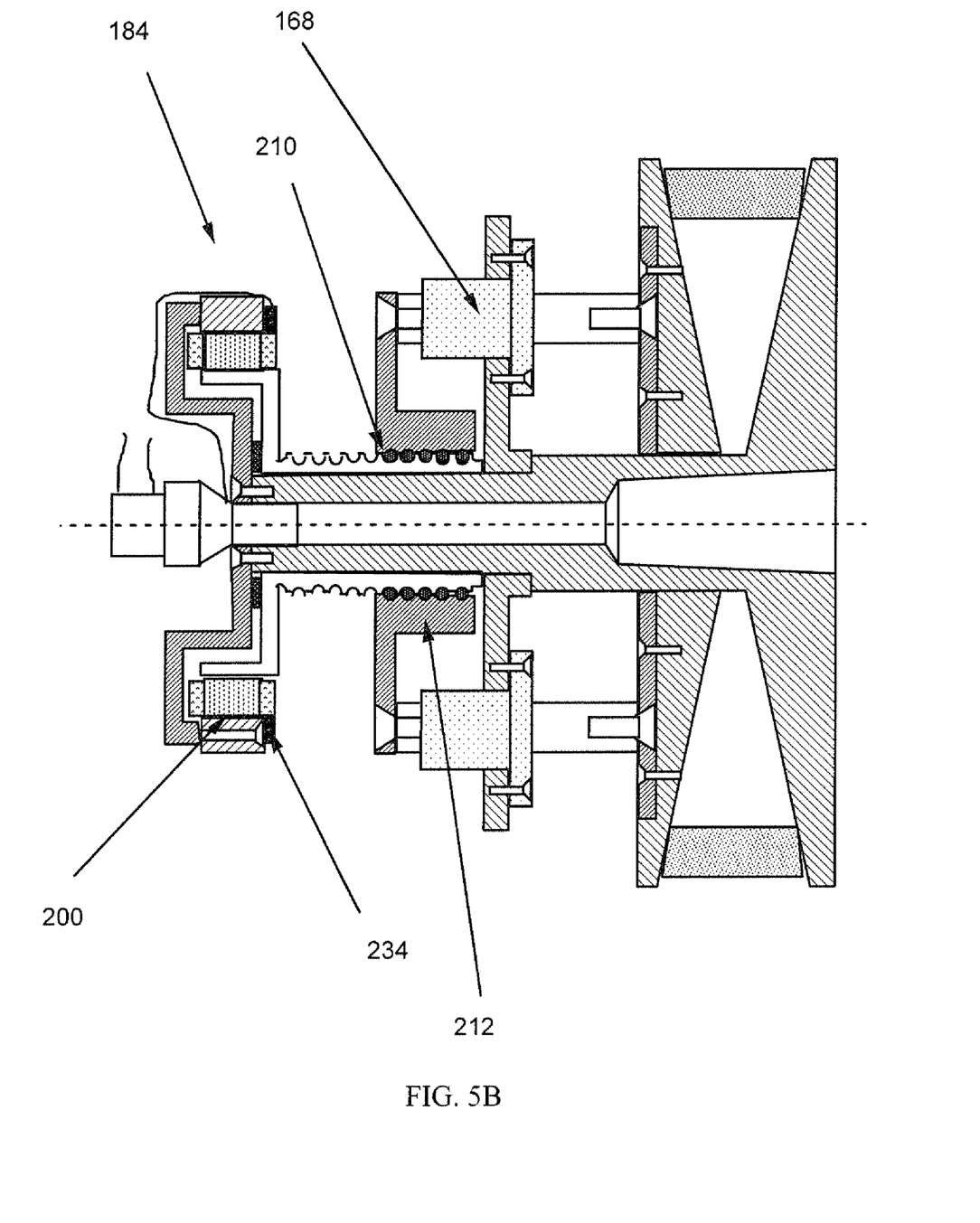
FIG. 5B is a cross-sectional view of the electrical actuator of FIG. 5A, shown in a higher speed ratio configuration.

FIGS. 5A and 5B show a fourth embodiment of a coaxially mounted electrical actuator 184, according to the present invention, for a CVT pulley 186 having a first pulley half 190 axially and rotatably fixed to the engine shaft (or other suitable power source, not shown), and a second, movable pulley half 188. The movable pulley half 188 is connected to at least two shafts or pins 170 by the base plate 172. The pins 170 pass through linear bearings 168, one for each pin 170. The linear bearings are fixed to the fixed pulley half 190 by the linear bearing plate 166. The combined effect of the linear bearing plate 166, the linear bearings 168, the pins 170, and the base plate 172 is to constrain the relative motion between the fixed pulley half 190 and the movable pulley half 188 to be only axial translation, along the axis 216.

The electric actuator 200 involves a frameless hollow motor that normally rotates with the engine shaft and fixed pulley 190 during operation of the engine. The motor's stator 198 (in this case the field magnets are in the outer part of the motor) is fixed to the fixed pulley half 190 by the cup 220. One suitable motor is a Moog D-5125-T-1ENS brush-type torque motor. The motor's rotor 202 (in this case the armature in the inner part of the motor 200) normally rotates at the same speed as the engine shaft and the fixed pulley 190 when no axial spacing change between the pulley halves is required, but changes speed with respect to the engine shaft when the electrical actuator is used to change the axial spacing between the pulley halves. In another configuration of this embodiment, the stator may comprise the armature and the rotor may comprise the field magnets. The inner rotating part 204 of the motor is connected to the ball screw thread 208, which is constrained from moving axially relative to the fixed pulley half 190 by the thrust bearing 219 and contact at 231, but is free to rotate with respect to the fixed pulley half 190 about axis of rotation 216. The outer part of the ball screw 212, called the ball screw nut, is fixed to the outboard ends of pins 170 at 171.

When current is applied to the motor and relative motion is thereby imparted between its rotating parts, the ball screw thread 208 is rotated relative to the ball screw nut 212, causing it to move axially relative to the fixed pulley half 190. This causes the movable pulley half 188 to translate axially relative to the fixed pulley half according to the constraints of the helix angle of the ball screw 210, such that the belt 118 is forced to contact the pulleys in different radial positions, changing the speed ratio of the CVT. When the opposite rotational motion is imparted to the motor, the pulley halves are moved in the opposite direction.

The motor can be of either the brushed type or brushless type. For the brushed type, a commutator is used (not shown). The commutator has an outer part that rotates with the outer part of the motor 198, and an inner part that rotates with the inner part of the motor 202. Brushes 234 connect these two parts through contacts that switch current among the coils in the motor to maintain proper orientation of the magnetic fields. Slip rings 235 power the spinning motor from a power source not rotating with the engine shaft.

For a brushless-frameless motor embodiment of the design shown in FIGS. 5a and 5b, sensors would be incorporated with the motor parts that produce signals indicative of the relative angular orientation of the inner and outer motor parts. These sensors would replace the commutator. Slip rings would be used to connect the sensors to a suitable electronic brushless motor controller not rotating with the engine shaft.

It should be understood by anyone of ordinary skill in the art that the ball screw 210 could be replaced with any other suitable type of threaded connection, and the linear bearings 168 could be replaced with any other suitable device which constrains the relative motion between the pulley halves to be only axial translation, including other types of rollers or splines.

One advantage of the embodiment shown in FIGS. 5A and 5B over other concentric motor designs is that the belt tension (resulting from engine drive torque) has no influence on the actuation tendencies of the pulley halves 188 and 190, because the two pulley halves are constrained to rotate together. This may be desirable for high engine power applications.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, other electronic CVT actuator features which may be suitable for use in certain applications of the present invention are disclosed in currently co-pending U.S. patent application Ser. Nos. 11/120,148 and 11/415,391, assigned to the assignee of the present invention, which applications are hereby incorporated by reference along with all references cited therein.

We claim:

1. An electrically actuated continuously variable transmission (CVT), comprising:
    first and second variable-diameter pulleys mechanically linked by a flexible drive member, each of said pulleys having first and second relatively axially movable pulley portions; and
    an electrical actuator coaxially mounted to said first pulley, said electrical actuator having a stator nonrotatably connected to said first pulley portion of said first pulley, and a rotor connected to said second pulley portion of said first pulley through a threaded connection having concentric male and female threaded parts with substantially equal pitch diameter.

2. The transmission of claim 1, wherein said stator and said rotor are relatively axially movable, and wherein said actuator includes an axially translating commutator interconnecting said stator and said rotor.

3. The transmission of claim 1, wherein said stator and said rotor are axially fixed with respect to each other and are outside of said threaded connection.

4. The CVT of claim 1, wherein said threaded connection comprises a ball screw.

5. The CVT of claim 4, wherein said rotor is outside of said ball screw.

6. An electrically actuated continuously variable transmission (CVT), comprising:
    first and second variable-diameter pulleys mechanically linked by a flexible drive member, each of said pulleys having first and second relatively axially movable pulley portions; and
    an electrical actuator having first and second relatively movable parts coaxially mounted to said first pulley, said first part rotatably fixed to the first pulley portion of said first pulley, said second part connected to the second pulley portion of said first pulley through a threaded connection having concentric male and female threaded parts with substantially equal pitch diameter.

7. The electrically actuated CVT of claim 6, wherein said first and second parts of said electrical actuator are relatively axially movable, and wherein said actuator includes an axially translating commutator interconnecting said first and second parts.

8. The electrically actuated CVT of claim 7, wherein said second part of said electrical actuator is rotatably fixed with respect to said second pulley portion of said first pulley.

9. The electrically actuated CVT of claim 6, wherein said first and second parts of said electrical actuator are axially fixed with respect to each other.

10. The electrically actuated CVT of claim 9, wherein said second part of said electrical actuator is rotatably fixed with respect to said second pulley portion of said first pulley.

11. The electrically actuated CVT of claim 10, further comprising a linear bearing connecting said second part of said electrical actuator to said second pulley portion of said first pulley.

12. The electrically actuated CVT of claim 10, further comprising a ball screw connecting said second pulley portion to said first pulley portion.

13. The electrically actuated CVT of claim 9, wherein said threaded connection comprises a ball screw connecting said second part of said electrical actuator to said second pulley portion.

14. The CVT of claim 13, wherein said second part of said electrical actuator is outside of said ball screw.

15. The CVT of claim 6, wherein said first and second parts of said electrical actuator are outside of said threaded connection.

16. A method of electrically actuating a continuously variable transmission (CVT) having first and second pulleys mechanically linked by a flexible drive member, said pulleys each having first and second relatively axially movable pulley portions, said method being performed with a coaxial electrical actuator having first and second relatively movable parts coaxially mounted to said first pulley, said method comprising:
    rotating said first and second coaxial electrical actuator parts along with said first pulley, with said first part fixed with respect to the first pulley portion of said first pulley;
    driving said second pulley portion of said first pulley with said second part of said electrical actuator through a rotary-to-linear-translation device having concentric male and female threaded parts with substantially equal pitch diameter; and
    energizing said electrical actuator to cause relative motion between said first and second electrical actuator parts so as to cause relative axial motion between said first and second portions of said first pulley.

17. The method of claim 16, wherein said actuator is an electric motor having a rotor and stator, wherein said stator is rotatably fixed to the first pulley portion of said first pulley; and wherein said driving step includes driving said second pulley portion of said first pulley with said rotor through said rotary-to-linear-translation device.

18. The method of claim 17, wherein said rotary-to-linear-translation device is a ball screw.

19. The method of claim 18, wherein said rotor is outside of said ball screw.

* * * * *